United States Patent
Roberts et al.

(10) Patent No.: US 6,486,990 B1
(45) Date of Patent: Nov. 26, 2002

(54) METHOD AND APPARATUS FOR COMMUNICATING A CLOCK SIGNAL IN A SOLITON OPTICAL TRANSMISSION SYSTEM

(75) Inventors: Kim Byron Roberts, Nepean (CA); Hanan Anis, Kanata (CA); Maurice S. O'Sullivan, Ottawa (CA)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/215,547

(22) Filed: Dec. 18, 1998

(51) Int. Cl.[7] ................................................ H04J 14/08
(52) U.S. Cl. ...................... 359/135; 359/138; 359/139; 359/140; 359/158; 359/188
(58) Field of Search ................................ 359/135, 138, 359/139, 140, 181, 188, 158

(56) References Cited

U.S. PATENT DOCUMENTS

| | | | |
|---|---|---|---|
| 5,625,479 A | * 4/1997 | Suzuki et al. | 359/135 |
| 5,710,649 A | * 1/1998 | Mollenauer | 359/123 |
| 5,786,918 A | * 7/1998 | Suzuki et al. | 359/135 |
| 5,831,752 A | * 11/1998 | Cotter et al. | 359/135 |
| 5,903,368 A | * 5/1999 | Desurvire et al. | 359/115 |
| 5,959,753 A | * 9/1999 | Duling | 359/158 |
| 5,999,292 A | * 12/1999 | Dennis et al. | 359/138 |

OTHER PUBLICATIONS

Nakazawa, M, et al., "80 Gbit/s Solition Data Transmission over 500 km with Unequal Amplitude Solitions for Timing Clock Extraction", Electronics Letters, pp. 1777–1778, Oct. 3, 1994, vol.: 30 Issue: 21.

* cited by examiner

Primary Examiner—Leslie Pascal
(74) Attorney, Agent, or Firm—Jeffrey M. Measures

(57) ABSTRACT

A sub-harmonic clock signal is provided in a series of soliton optical pulses that are transmitted at a given line rate in a soliton optical transmission system. The line rate defines time slots of equal duration. Each soliton optical pulse in every N time slots is modulated in a manner to make the pulse distinguishable from pulses in other time slots. The frequency of the sub-harmonic clock signal is equal to the line rate divided by N. This technique of providing a clock signal allows simple recovery of the clock signal using a PIN diode photo detector and a bandpass filter of appropriate bandwidth.

17 Claims, 5 Drawing Sheets

METHOD AND APPARATUS FOR COMMUNICATING A CLOCK SIGNAL IN A SOLITON OPTICAL TRANSMISSION SYSTEM

FIELD OF THE INVENTION

This invention relates to clock signals in optical systems, particularly to transmitting a clock signal in soliton optical transmission system.

BACKGROUND OF THE INVENTION

In very long distance optical fiber links, it is known to use a soliton type of optical signal to minimize the effects of chromatic dispersion on the signal due to the dispersive properties of the fiber. A soliton type of signal makes use of the way in which the refractive index of the fiber varies with signal intensity in order to offset the dispersive effects, thereby preserving the spectral form of the signal as it propagates along the fiber.

In a transmitter of the system, a group of data channels are time division multiplexed into a single channel, typically having a bit rate of 100 Gb/s, and the information in the single channel is transmitted over the fiber by the soliton signal. In the optical link, in-line optical amplifiers, such as erbium doped fiber amplifiers (EDFA), amplify the soliton signal to compensate for line losses of the link. Regenerators may also be used, especially in very long links, to recreate the original soliton signal, thereby removing effects from propagation and amplification, such as timing jitter, noise, and minimal spectral dispersion. At the end of the link, a receiver demultiplexes the data channels from soliton signal.

Both the regenerator and the receiver require a clock signal at the full line rate, 100 Gb/s, in order to perform their functions. Further, the regenerator would require a 100 Gb/s electrical clock signal in order to regenerate the soliton signal without time division demultiplexing it into the separate data channels. However, generating a 100 GHz electrical clock signal from a 100 Gb/s soliton signal presents a problem because opto-electronic convertors (i.e. PIN diodes) that can operate at such a frequency are not available now, nor are they likely to become available in the near future. Furthermore, all-optical solutions for generating a 100 GHz clock signal are unattractive because of their complexity, size, and lack of stability.

SUMMARY OF THE INVENTION

An object of the present invention is to provide method and apparatus for communicating a clock signal in a soliton optical transmission system.

The invention provides a stream of soliton optical pulses having a spectral line in their frequency spectrum at the line rate of the pulses divided by an integer (N). To this end, the stream of soliton pulses is modulated with the clock signal, which is an Nth sub-harmonic of the line rate of the soliton pulses. Accordingly, the average energy of the pulses in every Nth time slot is distinct from the rest of the pulses in the other time slots. This distinction in the average energy can be detected, thereby allowing recovery of the clock signal. For example, in a 100 Gb/s soliton system, the pulse in every fourth time slot would be modulated thereby corresponding to a 25 GHz clock signal.

An advantage of communicating the clock signal by modulating the stream of soliton pulses is that it does not use additional fiber bandwidth, hence it does not adversely effect the throughput of the soliton system. That is, it does not reduce the rate at which soliton pulses can be transmitted across the fiber optic link.

Conveniently, the frequency of the clock signal is within the frequency range of currently available PIN diodes. An advantage of using a sub-harmonic clock signal of such a frequency is that an electrical clock signal can be easily obtained. Furthermore, the electrical clock signal can be up-converted to the full line rate for use in a regenerator. Moreover, such a solution is more attractive than all-optical solutions because it is less costly and less complex.

According to the invention the average energy in the Nth time slot is made distinct in a way that does not effect the propagation properties of the soliton pulses, thereby maintaining all the benefits that they provide. That is, modulated pulses in the Nth time slot remain soliton pulses and therefore they propagate along the fiber link as such. Accordingly, the pulses in the Nth time slot are modulated to change either their width-to-amplitude aspect ratio, their position within the time slot or their polarization. Alternatively, binary data symbols carried by the stream of soliton pulses could be encoded such that the data symbol carried by the pulse in the N/2th time slot has a probability greater than 0.5 of being the converse of the data symbol in the previous N/2th time slot. This encoding would also create a spectral line in the frequency spectrum of the pulses at the line rate divided by N.

According to an aspect of the present invention there is provided a transmitter for transmitting optical soliton pulses and providing a clock signal via the optical soliton pulses in a soliton optical transmission system comprising an optical soliton pulse source for generating optical soliton pulses at a first rate, the first rate defining time slots of equal duration; and a modulator for modulating each optical soliton pulse in every Nth time slot in a manner such that each said optical soliton pulse is distinguishable from optical soliton pulses in other time slots, whereby the clock signal has a frequency equal to the first rate divided by N, where N is an integer greater than one.

According to another aspect of the present invention there is provided a transmitter for transmitting optical soliton pulses over an optical fiber in a soliton optical transmission system comprising an optical soliton pulse source for generating optical soliton pulses at a first rate, the first rate defining time slots of equal duration; a data source for providing data symbols at the first rate; a plurality of modulators for modulating the optical soliton pulses in dependence upon the data symbols provided by the data source; and a first modulator of the plurality of modulators for modulating each optical soliton pulse in every Nth time slot in a manner such that said each optical soliton pulse is distinguishable from optical soliton pulses in other time slots.

According to another aspect of the present invention there is provided a receiver for receiving optical soliton pulses arriving at a first rate from an optical fiber in a soliton optical transmission system comprising means for recovering a clock signal from the optical soliton pulses, the clock signal having a frequency equal to the first rate divided by an integer N, wherein the integer N is greater than one; and a demultiplexer for demultiplexing the optical soliton pulses into a number of streams of optical soliton pulses responsive to the recovered clock signal, the number of streams being an integer multiple of the integer N.

According to another aspect of the present invention there is provided a method of encoding a clock signal in a soliton optical transmission system, the method comprising the steps of generating a series of optical soliton pulses at a first rate, the rate defining time slots of equal duration; and modulating each optical soliton pulse in every Nth time slot in a manner such that said each optical soliton pulse is distinguishable from optical soliton pulses in other time slots, where N is an integer greater than one.

According to yet another aspect of the present invention there is provided a method of recovering a clock signal in a soliton optical transmission system from a series of optical soliton pulses transmitted at a line rate, the clock signal having a frequency equal to the line rate divided by an integer N, wherein the integer N is greater than one, the method comprising the steps of receiving the optical soliton pulses; converting the optical soliton pulses to an electrical signal; filtering the frequency of the clock signal from the electrical signal to provide a filtered clock frequency signal; and amplifying the filtered clock signal frequency signal to provide a recovered clock signal.

According to still another aspect of the present invention there is provided a signal in an optical soliton transmission system comprising a series of optical soliton pulses transmitted at a line rate, the line rate defining time slots of equal duration, and each optical soliton pulse in every Nth time slot being distinguishable from optical soliton pulses in other time slots to encode a clock signal having a frequency of the line rate divided by N, where N is an integer greater than one.

BRIEF DESCRIPTION OF THE DRAWINGS

The invention will be further understood from the following description with reference to the drawings in which.

In the drawings, similar features are shown with like reference numerals.

DETAILED DESCRIPTION

Figure 1:
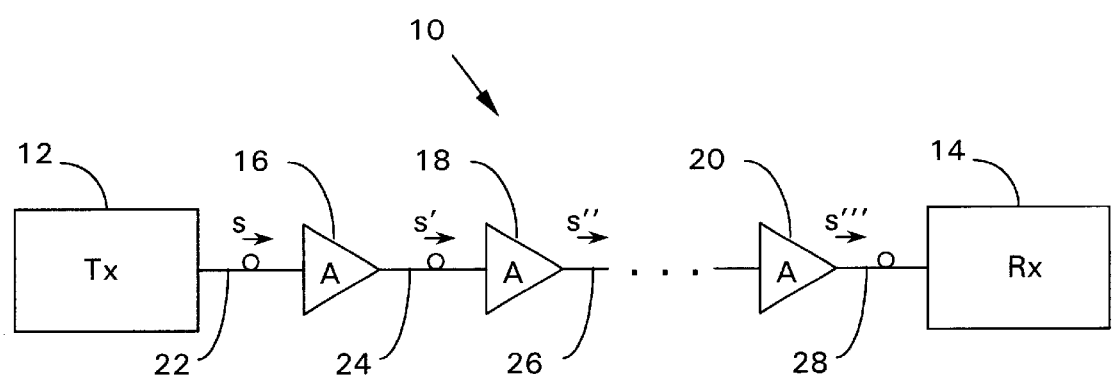
FIG. 1 is a block diagram of a soliton transmission system in accordance with an embodiment of the present invention.

FIG. 1 shows a soliton optical transmission system 10 in accordance with an embodiment of the present invention. The system 10 includes a transmitter 12, a receiver 14, first, second, and third amplifiers 16, 18, and 20. The transmitter is connected to the first amplifier 16 via an optical fiber link 22. The first amplifier 16 is connected to the second amplifier 18 via an optical fiber link 24. The second amplifier 18 is connected to the third amplifier 20 by a path 26, which includes at least one optical fiber link segment, but may also have amplifiers and regenerators connected by additional segments of optical fiber link. The third amplifier 20 is connected to the receiver 14 via an optical fiber link 28.

In operation, a signal s comprised of soliton optical pulses, each pulse representing a data symbol and the pulse in every fourth time slot modulated by a clock signal, is output from the transmitter 12 onto the link 22. The first amplifier 16 receives the signal s, amplifies it, and outputs a signal s' onto the link 24. The signal s' has the same information content as the signal s, but is slightly different due to noise, timing jitter and minimal spectral dispersion resulting from propagation and amplification. Similarly, the signal s' is input to the second amplifier 18 and an amplified signal s" with the same information content as the signal s' is output onto the path 26. The third amplifier 20 receives the signal s" from the path 26 or an equivalent representation of the signal s in the case of additional amplifiers (not shown) in the path 26. The signal s''' is output by the third amplifier 20 onto the link 28 and is received by the receiver 14. Although they are not shown, additional amplifiers connected by optical fiber links could connect the third amplifier 20 to the receiver 14. The receiver 14 receives the signal s from the link 28 and recovers the clock signal information from the soliton pulses in the signal s. The receiver then uses this information to generate a clock signal, which it uses in detecting the data symbol represented by each soliton pulse.

Figure 2:
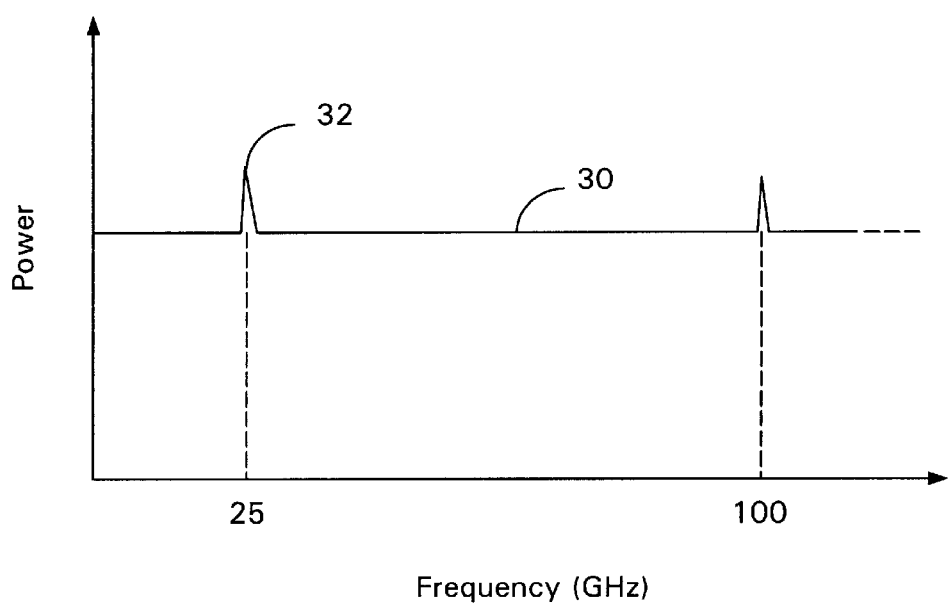
FIG. 2 is a frequency spectrum plot of the soliton pulses in the system of FIG. 1.

FIG. 2 is a frequency spectrum plot of the soliton pulses in the system of FIG. 1. The frequency spectrum 30 of the soliton pulses has a uniform distribution from zero to 100 GHz, assuming that the value of each data symbol is more or less random. A spectral line 32 is shown present at 25 GHz, due to the clock signal modulation of the pulses. The spectral line 32 is shown as an increase in power compared to the remainder of the spectrum 30.

Figure 3:
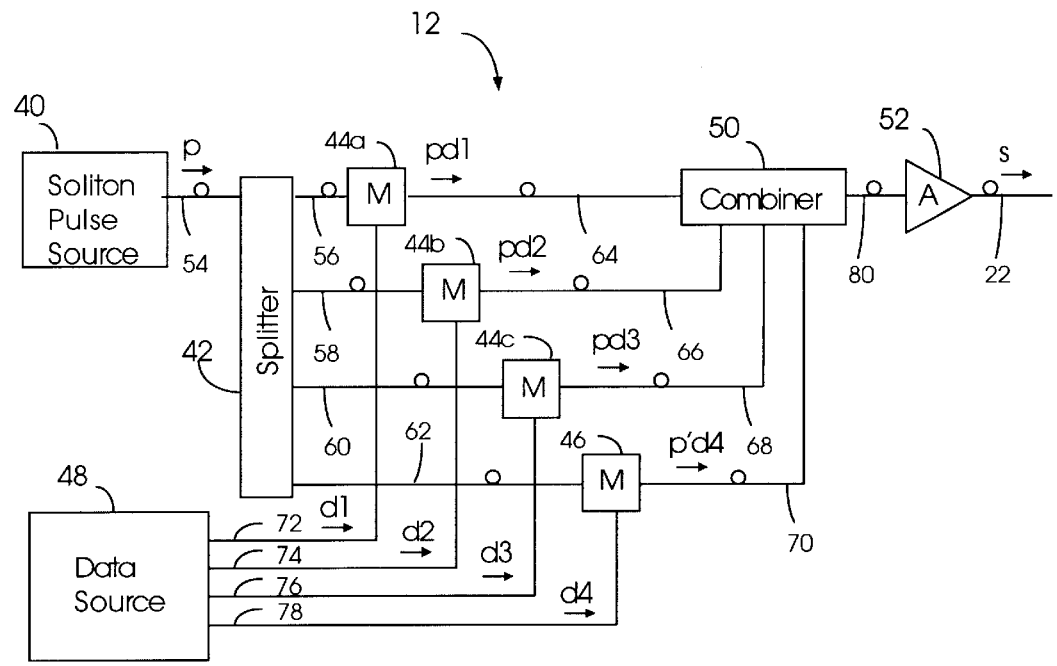
FIG. 3 is a block diagram of the transmitter of FIG. 1.

FIG. 3 is a block diagram of the transmitter 12 of FIG. 1. The transmitter 12 includes a soliton pulse source 40; a 1:4 optical splitter 42; first, second, and third modulators 44a, 44b, and 44c respectively; a fourth modulator 46; a data source 48; a 4:1 optical combiner 50; and an optical amplifier 52. The soliton pulse source 40 is connected to the optical splitter 42 via a fiber link 54. The splitter 42 is connected to the modulators 44a, 44b, 44c, and 46 by fiber links 56, 58, 60, and 62 respectively. The combiner 50 is connected to the modulators 44a, 44b, 44c, and 46 by fiber links 64, 66, 68, and 70 respectively. The data source 48 is connected to the modulators 44a, 44b, 44c, and 46 via fiber links 72, 74, 76, and 78 respectively. The amplifier 52 is connected to the combiner 50 by a fiber link 80. The fiber link 22 from FIG. 1 is shown connected to the output of the amplifier 52.

In operation, time division multiplexed data signals d1 to d4 are output from the data source 48 into the modulators 44a, 44b, 44c, and 46 over links 72, 74, 76, and 78 respectively. Each of the data signals d1 to d4 has a bit rate of 25 Gb/s.

A stream p of 2 ps duration soliton optical pulses is output from the soliton pulse source 40 at 25 GHz into the splitter 42 over the link 54. The splitter 42 divides the stream p into four optical signals of approximately equal power level, and the four signals are input to the modulators 44a, 44b, 44c, and 46 over links 56, 58, 60, and 62 respectively. The modulators 44a, 44b, 44c, and 46 modulate the pulses in their respective input signals according to the data symbols present in the data signals d1 to d4, respectively. Each of the modulators 44a, 44b, 44c, and 46 performs modulation as follows: if a logic true data symbol is present in the respective data signal d1 to d4 then the pulse is passed through the modulator; however, if a logic false data symbol is present in the respective data signal d1 to d4 then the pulse is not passed through the modulator. The fourth modulator 46 performs an additional modulation, which will be described later, in order that each pulse in the fourth time slot is distinguishable from pulses in the other time slots. Modulated pulse streams pd1, pd2, pd3, and p'd4 are output by the modulators 44a, 44b, 44c, and 46 to the links 64, 66, 68, and 70, respectively.

The combiner 50 optically combines the pulse streams pd1, pd2, pd3, and p'd4 with appropriate delays and outputs a TDM signal having a line rate of 100 Gb/s onto the link 80. The amplifier 52 receives the TDM signal from the link 80, amplifies it, and outputs the signal s onto the link 22. According to the above, the signal s, which has a line rate of 100 Gb/s, is comprised of soliton pulses, each pulse representing a data symbol and the pulse in every fourth time slot modulated by a 25 GHz clock signal.

Figure 4:
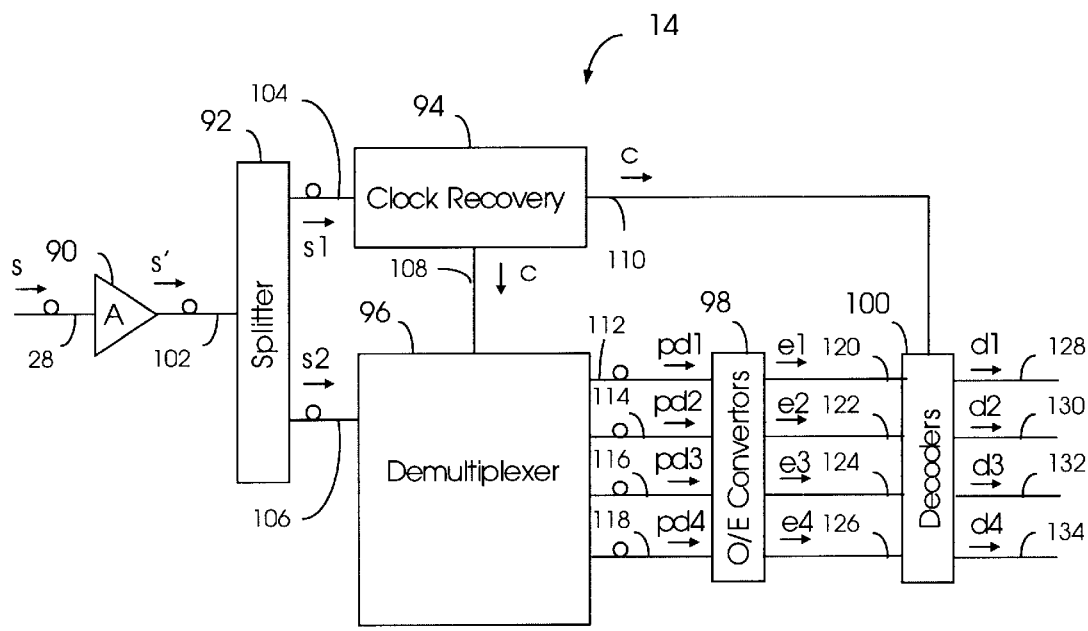
FIG. 4 is a block diagram of the receiver of FIG. 1.

FIG. 4 is a block diagram of the receiver 14 of FIG. 1. The receiver 14 includes an amplifier 90, a 1:2 optical splitter 92, a clock recovery circuit 94, a 1:4 demultiplexer 96, a set of opto-electronic convertors 98 and a set of decoders 100. The receiver 14 is coupled to the soliton transmission system 10 by the fiber link 28, which is connected to the input of the amplifier 90. The amplifier 90 is connected to the splitter 92 via a fiber link 102. Links 104 and 106 connect the output of the splitter 92 to the clock recovery circuit 94 and the demultiplexer 96, respectively. An output of the clock recovery circuit 94 is connected to the decoders 100 by a link 110. Another output of the clock recovery circuit 94 is coupled to the demultiplexer 96 via a link 108. Outputs of the demultiplexer 96 are connected to the opto-electronic convertors 98 by links 112, 114, 116, and 118. Links 120, 122, 124, and 126 connect the outputs of the opto-electronic convertors 98 to the inputs of the decoders 100. Outputs of the decoders 100 are connected to links 128, 130, 132, and 134.

In operation, the receiver 14 receives the signal s from fiber link 28, and the signal s is input to the amplifier 90. The amplifier 90 amplifies the signal s and provides an amplified signal s' to the splitter 92 by way of the fiber link 102. The splitter 92 receives the amplified signal s' from the link 102 and splits it into two signals, s1 and s2, of approximately equal optical power. The splitter 92 feeds the signal s1 to the clock recovery circuit 94 and the signal s2 to the demultiplexer 96 over the links 104 and 106, respectively. The clock recovery circuit 94 detects the difference in average energy at 25 GHz, this difference due to modulation performed on soliton pulses in the fourth timeslot, and outputs a clock signal c onto the links 108 and 110. The demultiplexer 96 uses four different phases of the clock c to time division demultiplex the signal s2 into the pulse streams pd1, pd2, pd3, and p'd4 and output them onto the fiber links 112, 114, 116, and 118, respectively. These four different phases of the clock c are generated internally by the demultiplexer using four different delay elements, as is known in the art. The opto-electronic convertors 98 receive the pulse streams pd1, pd2, pd3 and p'd4, converts them to respective electrical signals e1 to e4, and output the signals e1 to e4 onto their respective links 120, 122, 124, and 126. The opto-electronic convertors 98 have a bandwidth that is less than 100 GHz, typically their bandwidth would be in the order of 25 GHz, therefore they output a pulse that is longer in duration than a corresponding input pulse. The decoders 100 receive the signals e1 to e4 from the links 120, 122, 124, and 126, as well as the clock signal c from the link 110. The decoders 100 use the 25 GHz clock signal c to sample their respective signal, e1 to e4, during the approximate pulse duration midpoint, in order to determine the logic symbol carried by a pulse. Data symbols determined by the decoders 100 from signals e1 to e4 are output as the data signals d1 to d4 over the links 128, 130, 132, and 134, respectively.

Figure 5:
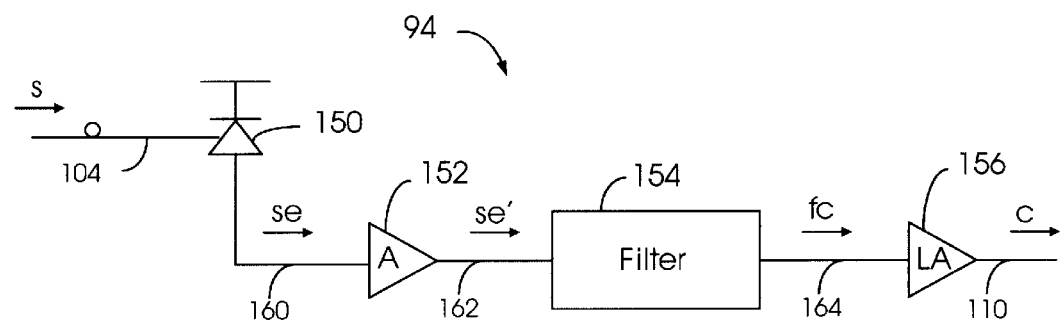
FIG. 5 is a block diagram of the clock recovery circuit of FIG. 4.

FIG. 5 is a block diagram of the clock recovery circuit 94 of FIG. 4. The clock recovery circuit 94 includes a PIN diode 150 an electrical amplifier 152 a 25 GHz bandpass filter 154, and a limiting amplifier 156. The optical fiber link 104 provides optical signal stimulus to the PIN diode 150 and an electrical link 160 connects the output of the PIN diode 150 to the amplifier 152. The output of the amplifier 152 is connected to the filter 154 via an electrical link 162. Another electrical link 164 provides connection between the output of the filter 154 and the input of the limiting amplifier 156. The output of the limiting amplifier 156 is connected to the decoders 100 via the link 110. The link 108 shown in FIG. 4 to provide a connection between the demultiplexer 96 and clock recovery circuit 94 has been omitted for clarity, but is also connected to the output of the limiting amplifier 156.

It should be noted that the filter 154 is a bandpass filter with a high Q-factor, typically in the order of 1000. Such filters are commercially available. A preferred type is one that uses a dielectric resonator for achieving a Q-factor of 1000 or greater. Further, the limiting amplifier 156 has very high gain such that an input signal of very small amplitude will cause the limiting amplifier 156 to output a signal that has a large voltage swing. In this way, amplitude variations in the input signal are suppressed such that the limiting amplifier 156 outputs a signal with consistent amplitude, which is desirable for a clock signal.

In operation, the clock recovery circuit 94 receives the signal s as input via the link 104. Optical energy from the signal s applied to the PIN diode 150 is converted to electrical energy. This energy is transmitted by an electrical signal se to the amplifier 152 by way of the link 160. The signal se contains a spectrum of the signal s in the region around 25 GHz. The amplifier 152 receives the signal se and outputs an amplified version se' onto the link 162. The signal se' is input to the filter 154 by the link 162. The filter 154 allows frequencies at and very near its center frequency, 25 GHz, to pass through it and onto the link 164. In this way, a clock frequency fc that corresponds to the distinct average energy encoded in the fourth time slot, is detected from the signal s. The clock frequency fc is input to the limiting amplifier 156, and the amplifier 156 amplifies it to produce a clock signal c. The clock signal c is output from the limiting amplifier 156 over the link 110 (and 108 not shown).

Figure 6:
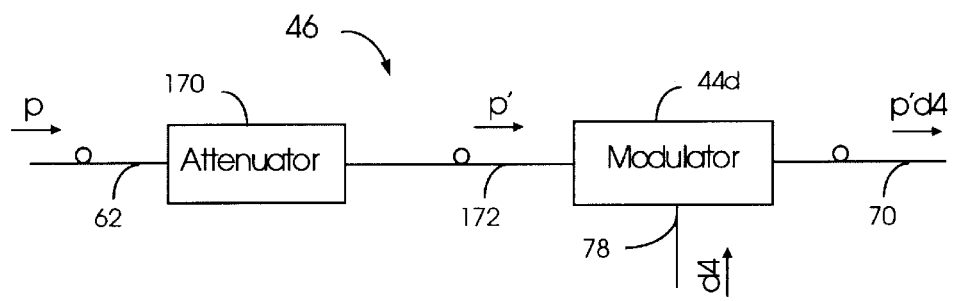
FIG. 6 is a block diagram of a first embodiment of the fourth modulator in FIG. 3.

FIG. 6 is a block diagram of a first embodiment of the fourth modulator 46 in FIG. 3. The modulator 46 includes a 0.25 dB attenuator 170 and a modulator 44d that is the same as the modulators 44a to 44c that were described previously. The attenuator 170 is connected to the modulator 44d via an optical fiber link 172. The fiber link 62 provides connection between the attenuator 170 and the splitter 42 shown in FIG. 3. The data signal d4 is input to the modulator 44d via the link 78. The output of the modulator 44d is connected to the combiner 50 via the fiber link 70.

In operation, the stream p of soliton pulses is input to the attenuator 170 by way of the fiber link 62. The attenuator 170 provides a 0.25 dB attenuation to the stream p and outputs an attenuated stream of soliton pulses p' onto the link 172. The attenuated stream of soliton pulses p' is input to the modulator 44d via the link 172. The modulator 44d modulates the stream of attenuated pulses p' according to the data content in the data signal d4 in the same manner as modulators 44a to 44c, the operation of which having been previously explained. The modulated pulse stream p'd4 is output onto the link 70 and is applied to the combiner 50, as shown in FIG. 3. Accordingly, each modulated soliton pulse in the fourth time slot is attenuated by 0.25 dB. This attenuation causes the average energy of the pulses in the fourth time slot to be distinct from the average energy of pulses in the other time slots. In this way, the 25 GHz sub-harmonic clock signal c is provided in the signal s by the transmitter 12 and is detectable by the receiver 14.

It should be noted that while the modulator 46 attenuates each soliton pulse by 0.25 dB, thus providing amplitude modulation of each pulse in the fourth time slot, amplification could alternatively be performed to achieve the same desired result. That is, to cause the average energy of the pulses in every four time slots to be distinct from the average energy of the pulses in the other time slots.

Figure 7:
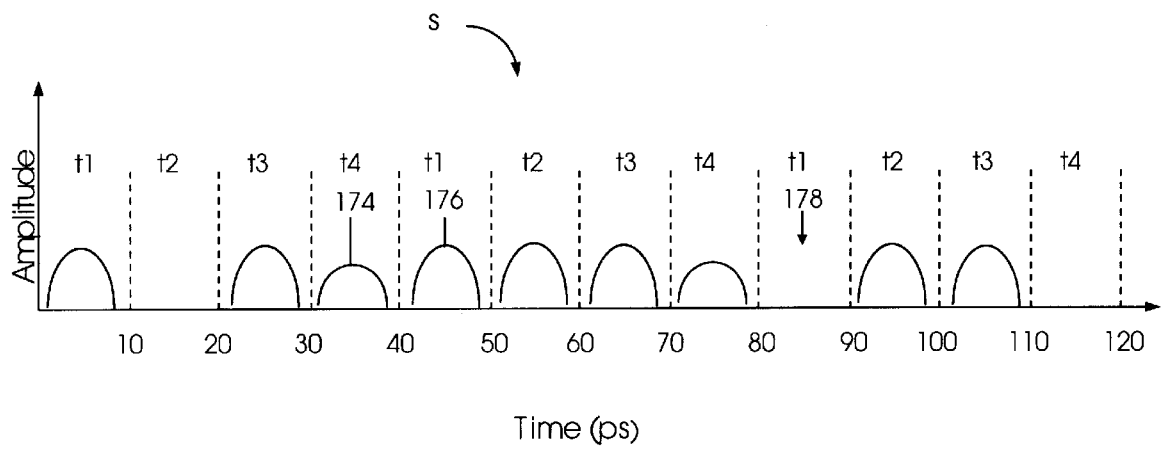
FIG. 7 is a diagram of the soliton pulses in FIG. 1 using the modulator of FIG. 6.

FIG. 7 is a diagram of the soliton pulses, not drawn to scale, in the signal s of FIG. 1 that result from using the first embodiment of the modulator 46 of FIG. 6. The signal s is depicted as a sequence of soliton pulses. The sequence is a result of the combination of modulated pulse streams pd1, pd2, pd3, and p'd4, as shown in FIG. 3. Four time slots are shown and are labelled t1 to t4. A soliton pulse 176 having normal amplitude is shown in time slot t1. An attenuated soliton pulse 174 having an attenuation of 0.25 dB is shown in time slot t4. The absence 178 of a pulse is shown in time slot t1. It should be apparent from FIG. 7 and from the description of operation of the modulators 44a to 44d that not all instances of a time slot will contain a soliton pulse. Rather, the present or absence of a pulse in a particular instance of a time slot is dependent on the data symbol in a respective data signal d1 to d4, as previously described.

Figure 8:
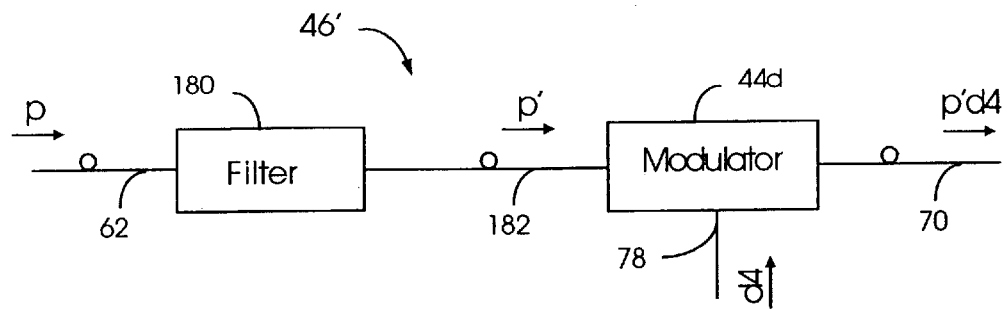
FIG. 8 is a block diagram of a second embodiment of the fourth modulator of FIG. 3.

FIG. 8 is a block diagram of a second embodiment 46' of the fourth modulator 46 in FIG. 3. The modulator 46' includes a pulse broadening filter 180 and the modulator 44d. The filter 180 is connected to the modulator 44d via an optical fiber link 182. The fiber link 62 provides connection between the filter 180 and the splitter 42 shown in FIG. 3. The data signal d4 is input to the modulator 44d via the link 78. The output of the modulator 44d is connected to the combiner 50 via the fiber link 70.

In operation, the stream p of soliton pulses is input to the filter 180 by way of the fiber link 62. The filter 180 widens (or broadens) input soliton pulses in the time domain and outputs a broadened stream of soliton pulses p' onto the link 182. Typically, the filter 180 broadens pulses in the stream p by 0.25 dB. The broadened stream of soliton pulses p' is input to the modulator 44d via the link 182. The modulator 44d modulates the stream of broadened pulses p' according to the data content in the data signal d4 as previously explained. The modulated pulse stream p'd4 is output onto the link 70 and is applied to the combiner 50, as shown in FIG. 3. Accordingly, each modulated soliton pulse in the fourth time slot is broadened by 0.25 dB, or about 0.12 ps for a 2 ps wide pulse. This broadening causes the average energy of the pulses in the fourth time slot to be distinct from the average energy of the pulses in the other time slots. In this way, the 25 GHz sub-harmonic clock signal c is provided in the signal s by the transmitter 12 and is detectable by the receiver 14.

It should be noted that while the modulator 46' widens each soliton pulse by 0.25 dB, thus providing pulse width modulation of each pulse in the fourth time slot, pulse narrowing could alternatively be performed to achieve the same desired result. That is, to cause the average energy of the pulses in every four time slots to be distinct from the average energy of the pulses in the other time slots.

Further, it should be noted that the energy of a soliton pulse is proportional to the product of its peak power and pulse width. In addition, the peak power of a soliton pulse is proportional to the inverse of the square of its pulse width. Therefore, the energy of a soliton pulse is proportional to the inverse of its pulse width. Thus, if each pulse in the fourth time slot is widened by 0.25 dB, then the peak power of each such pulse will be decreased by 0.5 dB, and the resulting energy of each such pulse will be 0.25 dB less than energy of the other pulses. Furthermore, these soliton pulses of decreased energy will propagate as stable soliton pulses and therefore, the combination of these two effects is advantageous.

Figure 9:
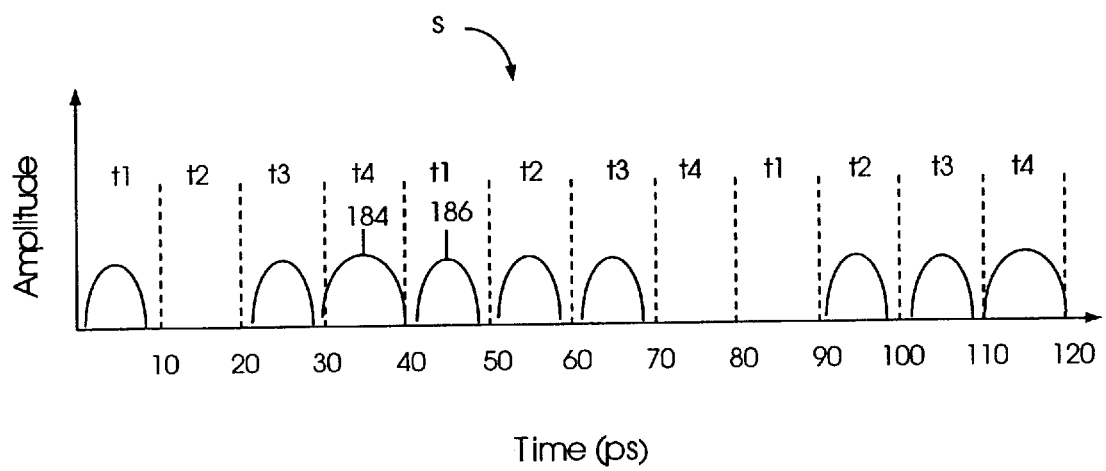
FIG. 9 is a diagram of the soliton pulses in FIG. 1 using the modulator of FIG. 8.

FIG. 9 is a diagram of the soliton pulses, not drawn to scale, in the signal s of FIG. 1 that result from using the modulator 46' of FIG. 8. The signal s is depicted as a sequence of soliton pulses. The sequence is a result of the combination of modulated pulse streams pd1, pd2, pd3, and p'd4, as shown in FIG. 3. Four time slots are shown and are labelled t1 to t4. A soliton pulse 186 having a normal pulse width is shown in time slot t1. A broadened soliton pulse 184 is shown in time slot t4. As previously explained, the presence or absence of soliton pulses in instances of time slots is dependent on the value of the data symbols in the data signals d1 to d4.

Figure 10:
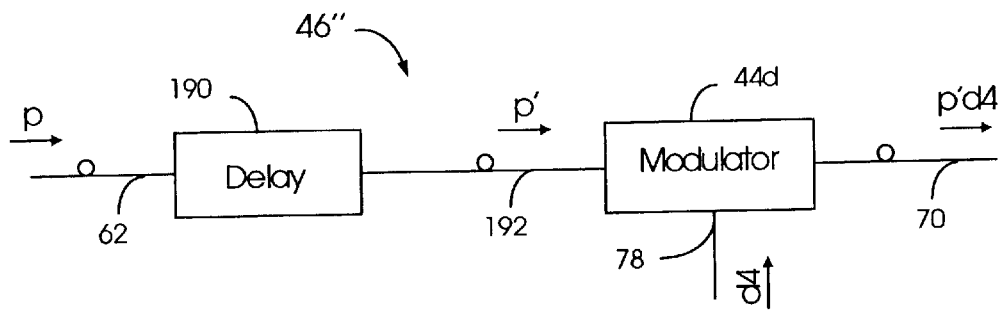
FIG. 10 is a block diagram of a third embodiment of the fourth modulator of FIG. 3.

FIG. 10 is a block diagram of a third embodiment 46" of the fourth modulator 46 in FIG. 3. The modulator 46" includes a delay element 190 and the modulator 44d. The delay element 190 is connected to the modulator 44d via an optical fiber link 192. The fiber link 62 provides connection between the delay element 190 and the splitter 42 shown in FIG. 3. The data signal d4 is input to the modulator 44d via the link 78. The output of the modulator 44d is connected to the combiner 50 via the fiber link 70.

In operation, the stream p of soliton pulses is input to the delay element 190 by way of the fiber link 62. The delay element 190 delays the input soliton pulses and outputs a delayed stream of soliton pulses p' onto the link 192. Typically, the delay element 190 delays pulses in the stream p by 10 to 20 percent of the time slot width, or 1–2 ps in the case of 10 ps wide time slot. The delayed stream of soliton pulses p' is input to the modulator 44d via the link 192. The modulator 44d modulates the stream of delayed pulses p' according to the data content in the data signal d4 in the same manner as was previously explained. The modulated pulse stream p'd4 is output onto the link 70 and is applied to the combiner 50, as shown in FIG. 3. Accordingly, each modulated soliton pulse in the fourth time slot is delayed by 1 to 2 ps. This delay causes the average energy of pulses in the fourth time slot to be distinct from the average energy of pulses in the other time slots in that the location of average energy in the time slot is distinct. In this way, the 25 GHz sub-harmonic clock signal c is provided in the signal s by the transmitter 12 and is detectable by the receiver 14.

It should be noted that while the modulator 46" delays each soliton pulse by 1–2 ps, thus providing timing modulation of each pulse in the fourth time slot, delay of pulses in the other time slots could alternatively be performed to achieve the same desired result. That is, to cause the average energy of the pulses in every four time slots to be distinct from the average energy of the pulses in the other time slots.

Figure 11:
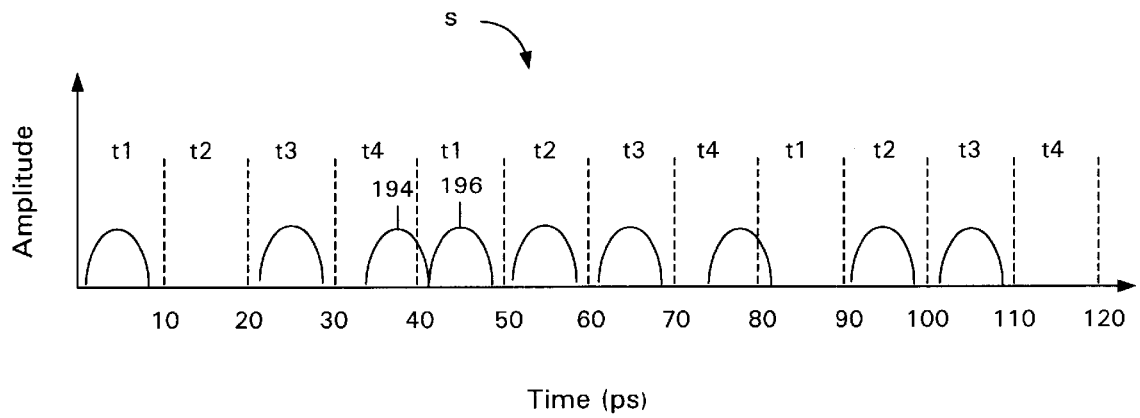
FIG. 11 is a diagram of the soliton pulses in FIG. 1 using the modulator of FIG. 10.

FIG. 11 is a diagram of the soliton pulses, not drawn to scale, in the signal s of FIG. 1 that result from using the modulator 46" of FIG. 10. The signal s is depicted as a sequence of soliton pulses. The sequence is a result of the combination of modulated pulse streams pd1, pd2, pd3, and p'd4, as shown in FIG. 3. Four time slots are shown and are labelled t1 to t4. A soliton pulse 196 in time slot t1 is shown having a normal pulse position in that time slot. A delayed soliton pulse 194 is shown in time slot t4. Note that the delayed soliton pulse 194 starts much after the beginning of the time slot t4 as compared to the soliton pulse 196. Again, as previously explained, the presence or absence of soliton pulses in instances of time slots is dependent on the value of the data symbols in the data signals d1 to d4.

Figure 12:
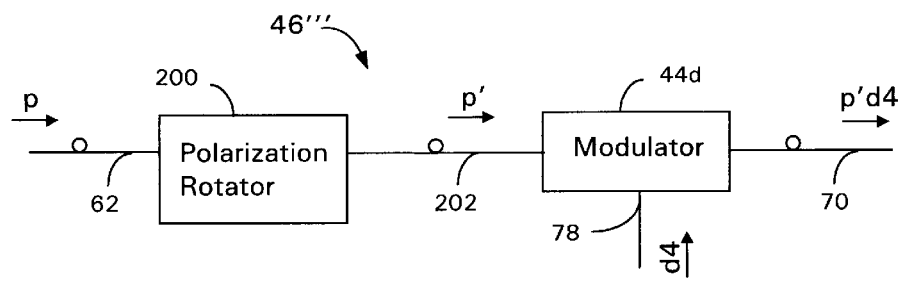
FIG. 12 is a block diagram of a fourth embodiment of the fourth modulator of FIG. 3.

FIG. 12 is a block diagram of a fourth embodiment 46''' of the fourth modulator 46 of FIG. 3. The modulator 46''' includes a polarization rotator 200 and the modulator 44d. The polarization rotator 200 is connected to the modulator 44d via an optical fiber link 202. The fiber link 62 provides connection between the polarization rotator 200 and the splitter 42 shown in FIG. 3. The data signal d4 is input to the modulator 44d via the link 78. The output of the modulator 44d is connected to the combiner 50 via the fiber link 70.

In operation, the stream p of soliton pulses is input to the polarization rotator 200 by way of the fiber link 62. The polarization rotator 200 changes the polarization of the input soliton pulses and outputs a polarization rotated stream of soliton pulses p' onto the link 202. Typically, the polarization rotator 200 rotates the polarization of the pulses in the stream p by 90 degrees. The polarization rotated stream of soliton pulses p' is input to the modulator 44d via the link 202. The modulator 44d modulates the stream of polarization rotated pulses p' according to the data content in the data signal d4 in the same manner as was previously explained. The modulated pulse stream p'd4 is output onto the link 70 and is applied to the combiner 50, as shown in FIG. 3. Accordingly, each modulated soliton pulse in the fourth time slot has a polarization that is 90 degrees different than the soliton pulses in the other time slots, t1 to t3. This difference in polarization causes the average energy of the pulses in the fourth time slot to be distinct from the average energy of pulses in the other time slots in that the average energy has a distinct polarization. In this way, the 25 GHz sub-harmonic clock signal c is provided in the signal s by the transmitter 12 and is detectable by the receiver 14.

It should be noted that while the modulator 46''' rotates the polarization of each soliton pulse, thus providing polarization modulation of each pulse in the fourth time slot, polarization rotation of the pulses in the other time slots could alternatively be performed to achieve the same desired result. That is, to cause the pulses in every four time slots to be distinct from the pulses in the other time slots.

Figure 13:
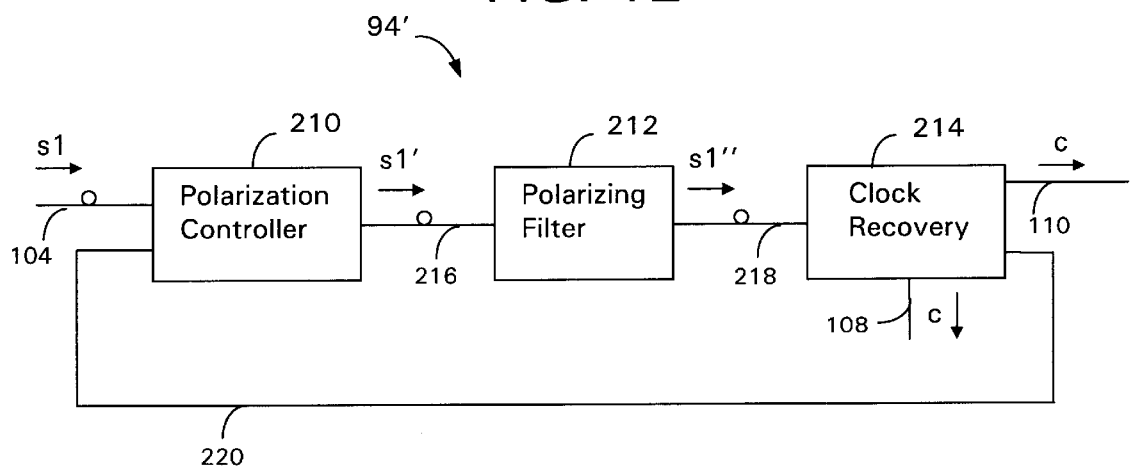
FIG. 13 is a block diagram of a second embodiment of the clock recovery circuit of FIG. 4 corresponding to the modulator of FIG. 12.

FIG. 13 is a block diagram of a second embodiment 94' of the clock recovery circuit 94 of FIG. 4 and is to be used in conjunction with the fourth embodiment of the modulator 46''' of FIG. 12. The clock recovery circuit 94' includes a polarization controller 210, a polarizing filter 212 and a clock recovery block 214. The output of the polarization controller 210 is connected to the input of polarizing filter 212 by a fiber link 216. The output of the polarizing filter 212 is connected to the input of the clock recovery block 214. The clock recovery block 214 is the same as clock recovery circuit 94 with one exception. The exception is that an additional output that indicates the amplitude of the 25 GHz sub-harmonic clock signal c is provided and connected to the polarization controller via a link 220. This additional output is taken from the output of the filter 154 at the link 164 shown in the clock recovery circuit 94 of FIG. 5. The fiber link 104 connects the input of the clock recovery circuit 94' to the splitter 92 as shown in FIG. 4. The output of the clock recovery circuit 94' is connected to the decoders 100 via the link 110 and to the demultiplexer 96 via the link 108, as shown in FIG. 4.

In operation, the signal s1 is input to the polarization controller by the link 104. The polarization controller 210 compensates for variations in the polarization due fiber links in the system 10 such as links 22, 24, 26, and 28 of FIG. 1. The polarization controller 210, provided with an indication of amplitude of the 25 GHz sub-harmonic clock signal c via the link 220, operates to keep the amplitude of the clock signal c at a maximum and outputs a compensated signal s1' that is a polarization compensated version of the signal s1. Such polarization controllers are known in the art. The compensated signal s1' is input to the polarizing filter 212 via the link 216. The polarizing filter 212 filters out light from an input signal according to the polarization of the light. The polarizing filter 212 has been selected to correspond to the polarization rotator 200 of FIG. 12, such that only light having a polarization as set by the polarization rotator 212 will pass through the polarizing filter 212. Consequently, a filtered signal s1'' being primarily the modulated pulse stream p'd4, as shown in FIG. 12, is output from the polarizing filter 212 onto the link 218. This filtered signal s1'' is input to the clock recovery block 214, which operates in the same manner and has the same structure as the clock recovery circuit 94 of FIG. 5. In short, the input signal s1'' is converted to an electrical signal se, this signal is amplified and input to a 25 GHz bandpass filter that outputs a clock frequency fc, which is amplified by a limiting amplifier to provide a clock signal c on the links 108 and 110. In this way, the 25 GHz clock signal c is recovered by from the signal s1 by the clock recovery circuit 94'.

Other techniques of causing the average energy of the pulses in every fourth time slot are possible. For example, coding could be performed on the data signals d1 to d4, whereby data symbols in every alternate fourth time slot have a higher probability of having complementary values, such that a fourth sub-harmonic (25 GHz) of the line rate (100 GHz) is generated in the signal s of optical soliton pulses. Clearly, this could be done at line rates other than 100 GHz and for any arbitrary (Nth) sub-harmonic frequency of the line rate. Furthermore, framing could be provided so that some of the time slots are dedicated to carrying data, while the remainder of the time slots, for example every fourth time slot, carry the sub-harmonic clock signal.

Numerous modifications, variations, and adaptations may be made to the particular embodiments of the invention described above without departing from the scope of the invention, which is defined in the claims.

What is claimed is:

1. An optical soliton transmission system for the transmission of optical soliton pulses and providing a clock signal via the optical soliton pulses comprising a transmitter and a receiver, wherein said transmitter comprises:

an optical soliton pulse source for generating optical soliton pulses at a first rate, the first rate defining time slots of equal duration; and a modulator for modulating each optical soliton pulse in every Nth time slot in a distinguishable manner from optical soliton pulses in other time slots, such that the clock signal has a frequency equal to the first rate divided by N, where N is an integer greater than one;

and wherein said receiver comprises:
  means for detecting said clock signal from the optical soliton pulses received from said transmitter, wherein said means for detecting includes a clock recovery circuit which operates at $1/N^{th}$ the speed of the first rate; and
  a demultiplexer for demultiplexing the optical soliton pulses into a number of streams of optical soliton pulses responsive to the detected clock signal, the number of streams being an integer multiple of the integer N.

2. A transmitter as claimed in claim 1, wherein the modulator is for performing amplitude modulation whereby the amplitude of said each optical soliton pulse in every Nth time slot is distinct from optical soliton pulses in other time slots.

3. A transmitter as claimed in claim 1, wherein the modulator is for performing pulse width modulation whereby the pulse width of said each optical soliton pulse in every Nth time slot is distinct from optical soliton pulses in other time slots.

4. A transmitter as claimed in claim 1, wherein the modulator is for performing polarization rotation whereby the polarization of said each optical soliton pulse in every Nth time slot is distinct from optical soliton pulses in other time slots.

5. A transmitter as claimed in claim 1, wherein the modulator is for performing timing modulation whereby s aid each optical soliton pulse in every Nth time slot has a position in its respective time slot that is distinct from the position of optical soliton pulses in other time slots.

6. The transmission system as claimed in claim 1 wherein said distinguishable manner changes the signal characteristics of said clock signal such that said means for detecting detects said clock signal based on said distinguishable manner.

7. A transmitter as claimed in claim 1, wherein the first modulator comprises an attenuator for attenuating said each optical soliton pulse in every Nth time slot.

8. A transmitter as claimed in claim 1, wherein the first modulator comprises a filter for widening said each optical soliton pulse in every Nth time slot.

9. A transmitter as claimed in claim 1, wherein the first modulator comprises a polarization rotator for rotating the polarization of said each optical soliton pulse in every Nth time slot.

10. A transmitter as claimed in claim 1, wherein the first modulator comprises a delay element for delaying said each optical soliton pulse in every Nth time slot.

11. The transmission system as claimed in claim 1 where said means for detecting detects said clock signal based on said distinguishable manner.

12. The system as claimed in claim 11 wherein said distinguishable manner includes a difference in the average energy of the pulses in every Nth time slot, and wherein said means for detecting detects said difference in average energy.

13. A receiver for receiving optical soliton pulses arriving at a first rate from an optical fiber in a soliton optical transmission system comprising:
  means for recovering a clock signal from the optical soliton pulses, the clock signal having a frequency equal to the first rate divided by an integer N, wherein the integer N is greater than one, wherein said means for recovering includes a clock recovery circuit which operates at $1/N^{th}$ the speed of the line rate; and
  a demultiplexer for demultiplexing the optical soliton pulses into a number of streams of optical soliton pulses responsive to the recovered clock signal, the number of streams being an integer multiple of the integer N.

14. A receiver as claimed in claim 13, wherein the optical soliton pulses have a spectral line in their frequency spectrum at the frequency of the clock signal and wherein the means further comprises:
  an opto-electronic convertor for providing an electrical signal in response to the optical soliton pulses; and
  a bandpass filter for filtering the frequency of the clock signal from the electrical signal, whereby the clock signal is recovered from the electrical signal.

15. The receiver as claimed in claim 14 wherein said opto-electronic convertor operates at $1/N^{th}$ the speed of the line rate.

16. A receiver as claimed in claim 13, wherein the first rate defines time slots of equal duration and each optical soliton pulse in every Nth time slot has a polarization that is distinct from optical soliton pulses in other time slots and wherein the means further comprises:
  a polarizing filter for filtering said each optical soliton pulse in every Nth time slot from optical soliton pulses in other time slots according to their polarization;
  an opto-electronic convertor for providing an electrical signal in response to the filtered optical soliton pulses in every Nth time slot; and
  a bandpass filter for filtering the frequency of the clock signal from the electrical signal, whereby the clock signal is recovered from the electrical signal.

17. A receiver as claimed in claim 16, wherein the receiver further comprises a polarization controller, responsive to the recovered clock signal, for compensating the polarization of the optical soliton pulses from the optical fiber, whereby the amplitude of the recovered clock signal is maximized.

* * * * *